United States Patent [19]

Bosik

[11] 4,194,091
[45] Mar. 18, 1980

[54] LINE FEED CIRCUIT

[75] Inventor: Barry S. Bosik, Parsippany, N.J.

[73] Assignee: Bell Telephone Laboratories, Incorporated, Murray Hill, N.J.

[21] Appl. No.: 974,386

[22] Filed: Dec. 29, 1978

[51] Int. Cl.² .................................................. H04M 3/02
[52] U.S. Cl. ................................... 179/77; 179/18 FA
[58] Field of Search ................. 179/77, 81 R, 18 F, 179/18 FA, 84 R, 84 A, 18 H, 18 B, 18 E, 18 HB, 16 F; 307/297; 323/22 T

[56] References Cited

U.S. PATENT DOCUMENTS

| | | | |
|---|---|---|---|
| 3,223,781 | 12/1965 | Hestad | 179/77 |
| 4,007,335 | 2/1977 | Hetherington et al. | 179/16 F |
| 4,099,032 | 7/1978 | Roge et al. | 179/18 FA |
| 4,135,062 | 1/1979 | Ferrieu | 179/77 |

Primary Examiner—Thomas A. Robinson
Attorney, Agent, or Firm—Robert O. Nimtz

[57] ABSTRACT

A line feed circuit for a telephone subscriber loop is disclosed which can be used to supply constant current to the subscriber loop. An operational amplifier, operating in its direct current mode, is used to maintain the current constant. The same operational amplifier, operating in its alternating current mode, magnifies the value of a capacitance bypassing the line feed circuit. In this way the alternating current impedance of the line feed circuit is maintained at a very low level.

4 Claims, 1 Drawing Figure

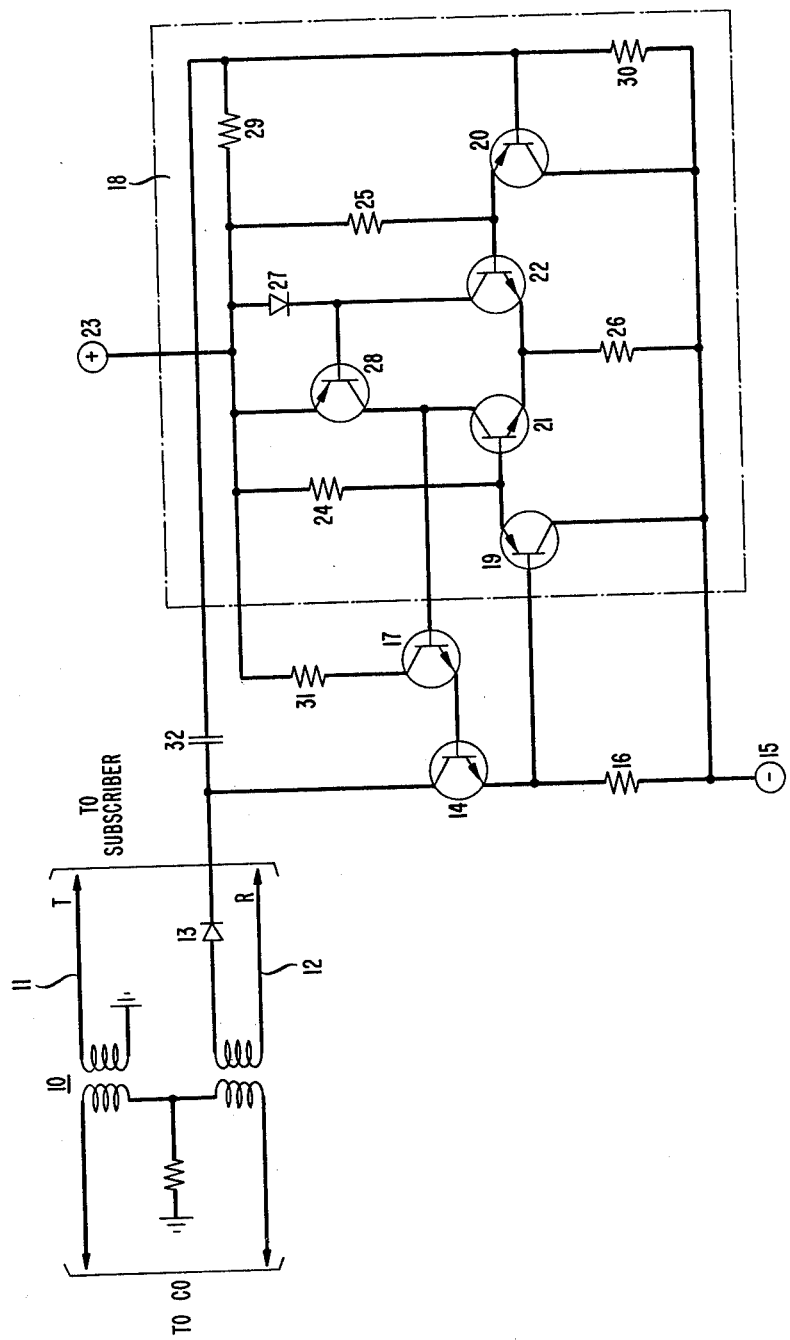

LINE FEED CIRCUIT

BACKGROUND OF THE INVENTION

1. Field of the Invention

This invention relates to telephone subscriber loop circuits and, more particularly, to a constant current line feed circuit for such loop circuits.

2. Description of the Prior Art

It has become increasingly common to serve telephone subscribers over carrier systems operating on the subscriber loops. This permits the transmission of a larger number of telephone conversations on a fewer number of metallic pairs. In some situations, such as long rural loops, the cost of additional metallic pairs can exceed the cost of carrier terminals and therefore the use of electronic carrier systems in the loop plant can be justified. One such carrier system is shown in the copending application of the present applicant Ser. No. 974,384, filed of even date herewith.

In such carrier derived loops, and in many standard telephone loops, it is desirable to maintain the level of direct current in the metallic connection to the subscriber (the local drop) at a preselected value regardless of the length of the metallic path. In a system that is power limited, such as one totally powered from the central office and limited due to the resistance of the transmission medium, it is imperative to insure that the power utilized by remote circuits is kept to a minimum within the constraints of the system. Therefore, instead of providing power to the local drop in such a way as to result in variable currents to the telephone set, as is the case with the standard constant voltage power feed circuits provided by local central offices, it becomes desirable to provide all telephone sets with the minimum current permissible, i.e., constant current power feed. In this manner the current provided becomes essentially independent of the impedance, and hence length of the local drop, as well as independent of the impedance of the telephone set.

A problem with line feed circuits is the inherent internal impedance of such feed circuits. Any longitudinal sixty hertz signals induced in the subscriber loop from adjacent power lines appear as a voltage across the line feed impedance, causing audible interference with voice transmission. Capacitor bypasses for these audible components require a very large capacitor to accommodate the low frequency sixty hertz signal.

SUMMARY OF THE INVENTION

In accordance with the illustrative embodiment of the present invention, an operational amplifier operating in its direct current mode is utilized to regulate the amount of current delivered to the local loop to provide a constant current power feed. The same operational amplifier, operating in its alternating current mode, magnifies the value of a capacitor bypassing the current feed circuit. This magnified capacitance reduces the source impedance of the feed circuit to an acceptable value.

A major advantage of the line feed circuit of the present invention is that it provides adequate talking current for each subscriber and yet limits the current to this adequate value, thereby conserving power, reducing the size of the power supply and providing a standard signal level at the carrier terminal. At the same time, induced alternating current longitudinal noise signals are bypassed around the line feed circuit to minimize the generation of noise voltages.

BRIEF DESCRIPTION OF THE DRAWING

The single FIGURE of the drawing discloses a detailed circuit diagram of a telephone subscriber line feed circuit in accordance with the present invention.

DETAILED DESCRIPTION

In the drawing, a hybrid transformer 10 couples the central office side of a subscriber loop to the subscriber side of the loop at tip lead 11 and ring lead 12. Ring lead 12 is connected through one winding of transformer 10 and a diode 13 to the line feed circuit comprising the balance of the drawing. The line feed circuit comprises a controlled transistor 14 which delivers current to the loop from negative voltage source 15 through resistor 16. The base of transistor 14 is controlled by the emitter current of transistor 17 in such a fashion as to maintain the current through the collector-emitter path of transistor 14 constant. To this end an operational amplifier 18 is provided.

Operational amplifier 18 comprises two input transistors 19 and 20 feeding a "long-tailed pair" comprising transistors 21 and 22. Transistors 19 and 20 are biased from a positive voltage source 23 through resistors 24 and 25, respectively. The emitters of transistors 21 and 22 are connected together through resistor 26 to negative supply voltage 15. A diode 27 in the collector circuit of transistor 22 and a transistor 28, the collector-emitter path of which is in the collector circuit of transistor 21, help insure equal current flow in the transistors of the long-tailed pair.

One input to amplifier 18 is the voltage across feed resistor 16, thereby providing a voltage proportional to the current flow in the subscriber loop. The other input to operational amplifier 18 is supplied across a voltage divider comprising resistors 29 and 30, connected between positive voltage source 23 and negative voltage source 15. The voltage supplied to the base of transistor 20 is therefore constant and the operational amplifier operates to maintain the current through resistor 16 at a related constant value. Thus the output of the operational amplifier 18, taken from the collector of transistor 21, is supplied to the base of transistor 17. The emitter of transistor 17 is connected to the base of transistor 14. The collector of transistor 17 is biased through resistor 31 from positive voltage source 23.

It can be seen that operational amplifier 18, operating in its direct current mode, serves to supply a constant current through the collector-emitter path of transistor 14. The same operational amplifier 18, operating in its alternating current mode, serves to magnify the capacitance of a bypass capacitor 32. Thus, alternating current signals from the ring conductor 12 cause an alternating current voltage to appear on the collector of transistor 14. Capacitor 32, being a low impedance compared to resistors 29 and 30, permits transmission of that voltage directly to the base of transistor 20, one input to the operational amplifier. The action of the operational amplifier causes an equal voltage to appear at the emitter of transistor 14. Since the same voltage appears at both the collector and emitter of transistor 14, it is effectively bypassed. The capacitor 32 therefore must be a low impedance with respect to resistors 29 and 30 rather than a low impedance compared to resistor 16 which would be the requirement if the transistor 14 were bypassed directly. Since the input impedance to the operational amplifier at the base of transistor 20 is quite high, resistors 29 and 30 can be made much larger than resistor 16 which is in the direct current path and must be kept small in order not to waste power. Hence a substantially smaller capacaitor can be used to perform the bypassing function, or alternatively, the smaller capacitor that is used has a greatly magnified effect by action of the operational amplifier.

The need to obtain capacitance magnification arises not only from the fact that the current source must maintain a low impedance at audio frequencies for proper signal transmission, but from the fact that longitudinal power line frequency currents induced in the cable pair to the customer cause current flow in the same path. It is necessary to provide a low impedance for these sixty hertz currents since any voltage developed in the loop due to these currents appears as noise in the subscriber receiver and becomes audible to the customer. Since the frequency of these currents is well below audio frequencies, much larger capacitors are required for bypassing. The size and cost of these capacitors can become prohibitive, making capacitor magnification an extremely valuable tool in realizing the line feed circuit.

The direct talking current is supplied from negative voltage source 15, through resistor 16 and transistor 14 to the ring conductor 12. The talking current path is completed through the subscriber telephone set, tip conductor 11 and back to ground potential.

It can be seen that the line feed circuit of the present invention not only maintains a constant current feed to the subscriber telephone set, but itself has a very low source impedance. This low source impedance reduces the talking signal drop across the line feed circuit and thereby provides a maximum talking signal across transformer 10 to be delivered back to the central office as well as to the customer. In addition, the effects of longitudinal power line induction are minimized.

I claim:

1. A line feed circuit for telephone subscriber loops characterized by
an operational amplifier,
a constant current source utilizing said operational amplifier in its direct current mode
a bypass capacitor connected around said constant current source, and
means for utilizing said operational amplifier in its alternating current mode for multiplying the value of said bypass capacitor.

2. The line feed circuit according to claim 1 further characterized in that
said operational amplifier comprises:
a pair of transistors having their emitter electrodes connected together through a common emitter impedance,
means for feeding a voltage proportional to the line current to the base of one of said transistors, and
means for supplying a constant voltage to the base of the other of said transistors.

3. A line feed circuit for telephone subscriber loops characterized by
a source of direct current voltage,
means including the collector-emitter path of a transistor for connecting said voltage source to said subscriber loop,
means for maintaining the direct current through said transistor collector-emitter path constant, and
means, including a capacitive element, for maintaining the same alternating current voltage at the collector and the emitter of said transistor in order to bypass the alternating current component of signals on said telephone loop.

4. The line feed circuit according to claim 3 further characterized by
an operational amplifier, operating in its direct current mode, for maintaining the direct current component through said collector-emitter path constant and, operating in its alternating current mode, for magnifying the value of said capacitance.

* * * * *